(12) United States Patent
Hu et al.

(10) Patent No.: US 8,842,620 B2
(45) Date of Patent: Sep. 23, 2014

(54) METHOD FOR ACCOMMODATING OVERLAPPING REFERENCE SIGNAL PATTERNS

(75) Inventors: Teck Hu, Melbourne, FL (US); Matthew Baker, Canterbury (GB)

(73) Assignee: Alcatel Lucent, Boulogne-Billancourt (FR)

( * ) Notice: Subject to any disclaimer, the term of this patent is extended or adjusted under 35 U.S.C. 154(b) by 365 days.

(21) Appl. No.: 13/205,931

(22) Filed: Aug. 9, 2011

(65) Prior Publication Data

US 2012/0051404 A1 Mar. 1, 2012

Related U.S. Application Data

(60) Provisional application No. 61/402,113, filed on Aug. 24, 2010.

(51) Int. Cl.
*H04J 3/14* (2006.01)
*H04L 5/00* (2006.01)

(52) U.S. Cl.
CPC .................................. *H04L 5/0048* (2013.01)
USPC ........................................ 370/329; 370/480

(58) Field of Classification Search
None
See application file for complete search history.

(56) References Cited

U.S. PATENT DOCUMENTS

| | | | |
|---|---|---|---|
| 2003/0202460 A1* | 10/2003 | Jung et al. | 370/208 |
| 2009/0196240 A1* | 8/2009 | Frederiksen et al. | 370/329 |
| 2010/0238821 A1* | 9/2010 | Liu et al. | 370/252 |
| 2010/0246376 A1* | 9/2010 | Nam et al. | 370/208 |
| 2011/0170562 A1* | 7/2011 | Hu et al. | 370/479 |
| 2012/0106374 A1* | 5/2012 | Gaal et al. | 370/252 |

OTHER PUBLICATIONS

Nokia, Further considerations on UE-specific reference symbol multiplexing for LTE-Advanced downlink;3GPP TSG RAN WG1 Meeting #57 R1-091757 San Francisco, USA, May 4-8, 2009.*
International Application PCT/US2011/048230 dated Nov. 3, 2011. Written Opinion.
NTT DOCOMO: "DM-RS Design for Backhaul 1-19 Link", 3GPP Draft; RI-I04939 DM-RS for UN Link, 3rd Generation Partnership Project (3GPP),Mobile Competence Centre , 650, Route Des Lucioles , F-06921 Sophia-Antipolis Cedex , France, vol. RAN WG1, no. Madrid, Spain; Aug. 23, 2010, Aug. 17, 2010, XP050450078,[retrieved on Aug. 17, 2010] the whole document.
Zte et al: "Performance Evaluation of UN DMRS", 3GPP Draft; R1-104561 UN DMRS, $3^{rd}$ Generation Partnership Project (3GPP), Mobile Competence Centre ; 650, Route Des Lucioles ; F-06921 Sophia-Antipolis Cedex ; France, vol. RAN WG1, no. Madrid, Spain; Aug. 23, 2010, Aug. 17, 2010, XP050449858,[retrieved on Aug. 17, 2010] the whole document.

(Continued)

*Primary Examiner* — Jeffrey M Rutkowski
*Assistant Examiner* — Hardikkumar Patel
(74) *Attorney, Agent, or Firm* — Davidson Sheehan LLP (57) ABSTRACT

The present application describes embodiments of methods and apparatuses that may be used to accommodate different reference symbol patterns. One embodiment of the method includes identifying overlapping resource element(s) in a resource block by comparing a first pattern of resource elements associated with first reference symbols to a second pattern of resource elements associated with second reference symbols. This embodiment also includes transmitting the first and second reference symbols in the overlapping resource element(s) when first and second antenna ports allocated for transmission of the first and second reference symbols in the overlapping resource element(s) are the same. Transmission of the first reference symbol in the overlapping resource elements is bypassed when the first and second antenna ports are different.

45 Claims, 6 Drawing Sheets

(56) References Cited

OTHER PUBLICATIONS

Alcatel-Lucent Shanghai Bell et al: "Un DM-RS Pattern for DL timing Case 3", 3GPP Draft; R1-104408, 3rd Generation Partnership Project (3GPP), Mobile Competence Centre ; 650, Route Des Lucioles ; F-06921 Sophia-Antipolis Cedex ; France, vol. RAN WG1, no. Madrid, Spain; Aug. 23, 2010, Aug. 17, 2010, XP050449746, [retrieved on Aug. 17, 2010] the whole document.

NTT DOCOMO: "Intra-cell CSI-RS Design", 3GPP Draft; R1-104199 Intra Cell CSI RS, 3rd Generation Partnership Project (3GPP), Mobile Competence Centre ; 650, Route Des Lucioles ; F-06921 Sophia-Antipolis Cedex ; France, vol. RAN WG1, no. Dresden, Germany; Jun. 28, 2010, Jul. 5, 2010, XP050449617, [retrieved on Jul. 5, 2010] the whole document.

* cited by examiner

METHOD FOR ACCOMMODATING OVERLAPPING REFERENCE SIGNAL PATTERNS

CROSS REFERENCE TO RELATED APPLICATIONS

This application claims priority to U.S. Provisional Patent Application 61/402,113, filed on Aug. 24, 2010.

BACKGROUND

This application relates generally to communication systems, and, more particularly, to wireless communication systems.

Wireless communication systems include a network of devices for providing wireless connectivity to wireless-enabled devices including mobile units, smart phones, tablet devices, laptops, desktops, and other types of user equipment. Exemplary access devices include access points, base stations, base station routers, node-Bs (NBs, eNBs), femtocells, and the like. The access devices and the user equipment communicate over channels of the air interface. The transfer function of the radio propagation channels of the air interface can be estimated and used to demodulate the data symbols that have been transmitted over the air interface. Conventional radio communication systems, such as systems that operate according to the Long Term Evolution (LTE) of the standards and/or protocols defined by the Third Generation Partnership Project (3GPP) standards body, embed reference signals into symbols transmitted over the air interface to enable the receiver to estimate the transfer function and demodulate the data symbols that are transmitted concurrently with the reference signals.

The LTE architecture implements orthogonal frequency division multiplexing (OFDM). A typical OFDM system transmits data over a large number of sub-carriers that are separated by a frequency spacing selected so that the subcarriers are orthogonal to each other. The data is divided into several parallel data streams or channels and each stream is allocated to one of the sub-carriers. Each sub-carrier is modulated with a conventional modulation scheme such as quadrature amplitude modulation or phase-shift keying. In LTE, time-frequency resources of the air interface are divided into resource blocks for uplink and downlink transmissions. A pair of LTE resource blocks (RBs) has a duration of 1 ms and a bandwidth of 180 kHz, which can be subdivided in the time domain into 14 symbols and in the frequency domain into 12 subcarriers. The smallest unit of resource is thus a resource element (RE) that represents 1 symbol on 1 subcarrier. A pair of resource blocks can therefore include 168 resource elements, e.g. for uplink and downlink transmissions.

The resource elements of each resource block are separated into data symbols and reference symbols. The number of reference symbols available to demodulate the associated data symbols is determined by the number of radio channels of the air interface, which is in turn defined by the number of transmit and receive antennas. For example, in a legacy single-input-single-output (SISO) system that includes one antenna for transmission and one antenna for reception, a single reference symbol may be used to demodulate data transmitted over the single channel between the transmitter and receiver. In order to allow the receiver to identify the reference symbols for different channels, different reference symbols occupy different patterns of resource elements within each resource block. As LTE systems become increasingly complex and incorporate larger numbers of antennas and radio links with multi-hop and multi-cell transmissions, the number of required reference symbol patterns will increase. In some situations it may become difficult to find a suitable pattern of reference elements for a reference symbol that does not collide with any other pattern of reference elements allocated to a different reference symbol.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, embodiments of methods are provided to accommodate different reference symbol patterns. One embodiment of the method includes identifying overlapping resource element(s) in a resource block by comparing a first pattern of resource elements associated with first reference symbols to a second pattern of resource elements associated with second reference symbols. This embodiment also includes transmitting the first and second reference symbols in the overlapping resource element(s) when first and second antenna ports allocated for transmission of the first and second reference symbols in the overlapping resource element(s) are the same. Transmission of the first reference symbol in the overlapping resource elements is bypassed when the first and second antenna ports are different.

In another embodiment, embodiments of apparatuses are provided to accommodate different reference symbol patterns. One embodiment of the apparatus includes a base station that is configured to identify overlapping resource element(s) in a resource block by comparing a first pattern of resource elements associated with first reference symbols to a second pattern of resource elements associated with second reference symbols. The base station is also configured to transmit the first and second reference symbols in the overlapping resource element(s) when first and second antenna ports allocated for transmission of the first and second reference symbols in the overlapping resource element(s) are the same. Transmission of the first reference symbol in the overlapping resource elements is bypassed when the first and second antenna ports are different.

In yet another embodiment, embodiments of the method are provided to accommodate different reference symbol patterns. One embodiment of the method includes modifying a first pattern of resource elements allocated to first reference symbols. Modifying the first pattern includes removing overlapping resource elements from the first pattern when the overlapping resource elements are allocated to second reference symbols that are to be transmitted using a different antenna port than the first reference symbols. Embodiments of the method may be implemented in a base station, a relay node, or user equipment.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Relay nodes may be placed in the communication path between a donor base station or eNB and user equipment (UE) to extend the range of the donor eNB. However, relay nodes cannot concurrently receive symbols on the forward link (or downlink) from the donor eNB and transmit symbols on the forward link (or downlink) to the user equipment because the same set of subcarriers are used for channels on both forward links. The relay node therefore alternates between receiving symbols from the donor eNB and relaying the symbols to user equipment. Relay nodes may perform a similar alternation between the legs of the reverse link (or uplink) from the user equipment to the donor eNB. Relay nodes therefore switch between a receive mode and a transmit mode. Performing the switch may require a finite amount of time that depends on the specific design capabilities of the relay node. For example, when the donor eNB and the relay node are time synchronized, the relay node may alternate between receive and transmit modes in successive resource blocks. In that case, the relay node may use the last symbol in each resource block to perform the switch.

One implication of this approach to mode switching is that the last symbol is no longer available to transmit reference symbols such as demodulation reference symbols (DMRSs). One way to address this problem is by shifting a portion of the DMRS symbol pattern from the last symbol to an earlier symbol in the resource block. However, this can lead to collisions with other types of reference signals such as channel state information reference symbols (CSI-RS) if the CSI-RS symbols and the shifted DMRS symbols are allocated to the same resource elements. Although the different reference symbols are encoded using different codes (such as Walsh codes) and can in principle be transmitted and received in the same resource element, in practice it may be virtually impossible to successfully estimate the transfer functions and demodulate/decode two reference signals that are encoded using different codes and then transmitted from different antenna ports over different radiofrequency channels.

The present application describes embodiments of techniques for shifting reference symbol patterns, e.g., to support reserving symbols for relay node mode switching. For example, the DMRS symbol pattern may be shifted out of the last symbol and conflicts between overlapping DM/CSI reference symbols may be resolved by restricting transmission of the DMRS to cases where the overlapping DM/CSI reference symbols for a particular resource element are transmitted using the same antenna port. The DMRS may not be transmitted in resource elements (e.g., transmission may be bypassed) when different antenna ports are allocated to the different types of reference symbols. For example, wireless communication standards may specify the antenna ports that are used to transmit reference symbols in the resource elements that are allocated for transmission of the reference symbols. When a base station decides to transmit DM reference symbols and a relay node is present in the communication path to the user equipment, the DM reference symbols may be shifted to a different set of resource elements. If the shifted reference symbols collide with any other reference symbols in any resource elements, then the overlapping resource elements can be used to transmit the different reference symbols if the resource elements use the same antenna port. Otherwise, the shifted reference symbols are bypassed and are not transmitted in this resource element.

Embodiments of the techniques described herein may therefore be used to modify a first pattern of resource elements allocated to first reference symbols to remove overlapping resource elements from the first pattern when the overlapping resource elements are also allocated to second reference symbols that are transmitted using a different antenna port than the first reference symbols. In one embodiment, each of the nodes in a communication path that includes at least a donor eNB, a relay node, and one or more user equipment can independently determine that the first reference symbols are going to be configured and so each of the nodes can configure themselves to receive and/or transmit signals based on the modified first pattern of resource elements. For example, each node may be configured according to a standard that allows the node to determine when to modify reference symbol patterns, e.g., when a relay node is present and both CSI and DM reference signals are to be transmitted. The nodes may then identify one or more overlapping resource elements by comparing a first pattern of resource elements associated with first reference symbols to a second pattern of resource elements associated with second reference symbols. The nodes can then determine which ports are allocated for transmission of the first and second reference symbols in the overlapping resource element(s). The first and second reference symbols may be transmitted in the overlapping resource element(s) when the same antenna ports are allocated for transmission of the first and second reference symbols in the overlapping resource element(s). Transmission of the first reference symbol in the overlapping resource element(s) may be bypassed when different antenna ports are allocated for transmission of the first and second reference symbols in the overlapping resource element(s).

Figure 1:
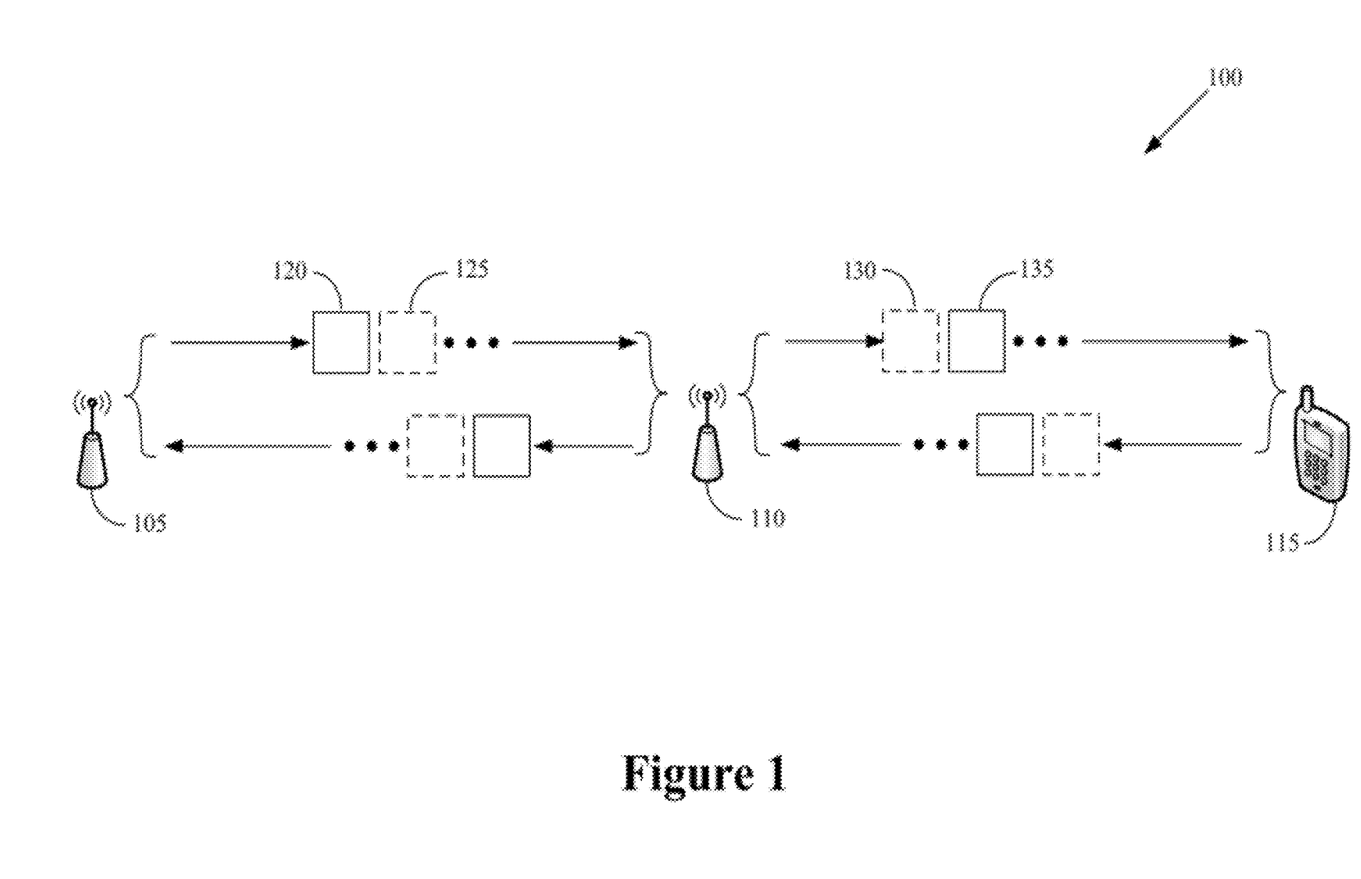
FIG. 1 conceptually illustrates one exemplary embodiment of a wireless communication system.

FIG. 1 conceptually illustrates one exemplary embodiment of a wireless communication system 100. In the illustrated embodiment, the wireless communication system 100 includes a donor base station or eNB 105, a relay node 110, and one or more user equipment 115. The elements of the wireless communication system 100 can communicate over the air interface according to various wireless communication standards and/or protocols. For example, the base station 105, relay node 110, and user equipment 115 may communicate according to the Long Term Evolution (LTE) of the standards and/or protocols defined by the Third Generation Partnership Project (3GPP, 3GPP2). However, persons of ordinary skill in the art having benefit of the present disclosure should appreciate that alternative embodiments of the wireless communication system 100 may operate according to other standards and/or protocols.

The relay node 110 is used to extend the range of a communication path between the base station 105 and user equipment 115. In the illustrated embodiment, the communication path includes a forward link or downlink that includes sections or legs that extend over the air interface between the base station 105 and the relay node 110 and sections or legs that extend over the air interface between the relay node 110 and user equipment 115. The communication path depicted in FIG. 1 also includes a reverse link or uplink that includes sections or legs that extend over the air interface between the user equipment 115 and the relay node and sections or legs that extend over the air interface between the relay node 110 and the base station 105. The relay node 110 may be capable of demodulating and/or decoding signals received from the base station 105 over a forward link and/or the user equipment 115 over a reverse link, amplifying the received signals, and then modulating and/or encoding the amplified signals for transmission to the user equipment 115 over the forward link and/or the base station 105 over the reverse link. Techniques for implementing, configuring, and/or operating relay nodes 110 are known in the art and in the interest of clarity only those aspects of implementing, configuring, and/or operating relay nodes 110 that are relevant to the claimed subject matter are discussed in detail herein.

In the illustrated embodiment, communication channels are defined using Orthogonal Frequency Division Multiplexing (OFDM) to transmit symbols over a group of subcarriers that use orthogonal frequencies. The relay node 110 should be a transparent element in the communication path and so the same subcarriers may carry signals over the air interface between the base station 105 and the relay node 110 and the air interface between the relay node 110 and user equipment 115. Consequently, the illustrated embodiment of the relay node 110 may not concurrently receive symbols from the base station 105 and transmit symbols to user equipment 115. For example, the relay node 110 may alternate between receiving a resource block 120 of symbols from the base station 105 and bypassing reception for a time interval 125. The relay node 110 may also bypass transmission of symbols to user equipment 115 during a time interval 130 (which may correspond to reception of the resource block 120) and then transmit a resource block 135 of symbols to user equipment 115 during a time interval that may correspond to the time interval 125. A similar alternation may be performed on the legs of the reverse link.

The relay node 110 may use a finite amount of time to switch between the transmission mode and reception mode. The actual amount of time used to perform the switch may depend on the specific design capabilities of the relay node 110. For example, the relay node 110 may use the time interval allocated to transmit or receive the last symbol in each resource block to perform the switch. However, in alternative embodiments, longer or shorter time intervals may be allocated for performing mode switching at the relay node 110. Moreover, these time intervals may be associated with any symbol, resource element, resource block, or other time interval. Reference signals may not be transmitted in the resource elements that are reserved for mode switching. The resource elements that are allocated to transmit different types of reference signals may therefore be shifted and/or de-allocated to accommodate the symbols or other time intervals that are reserved for mode switching.

Figure 2:
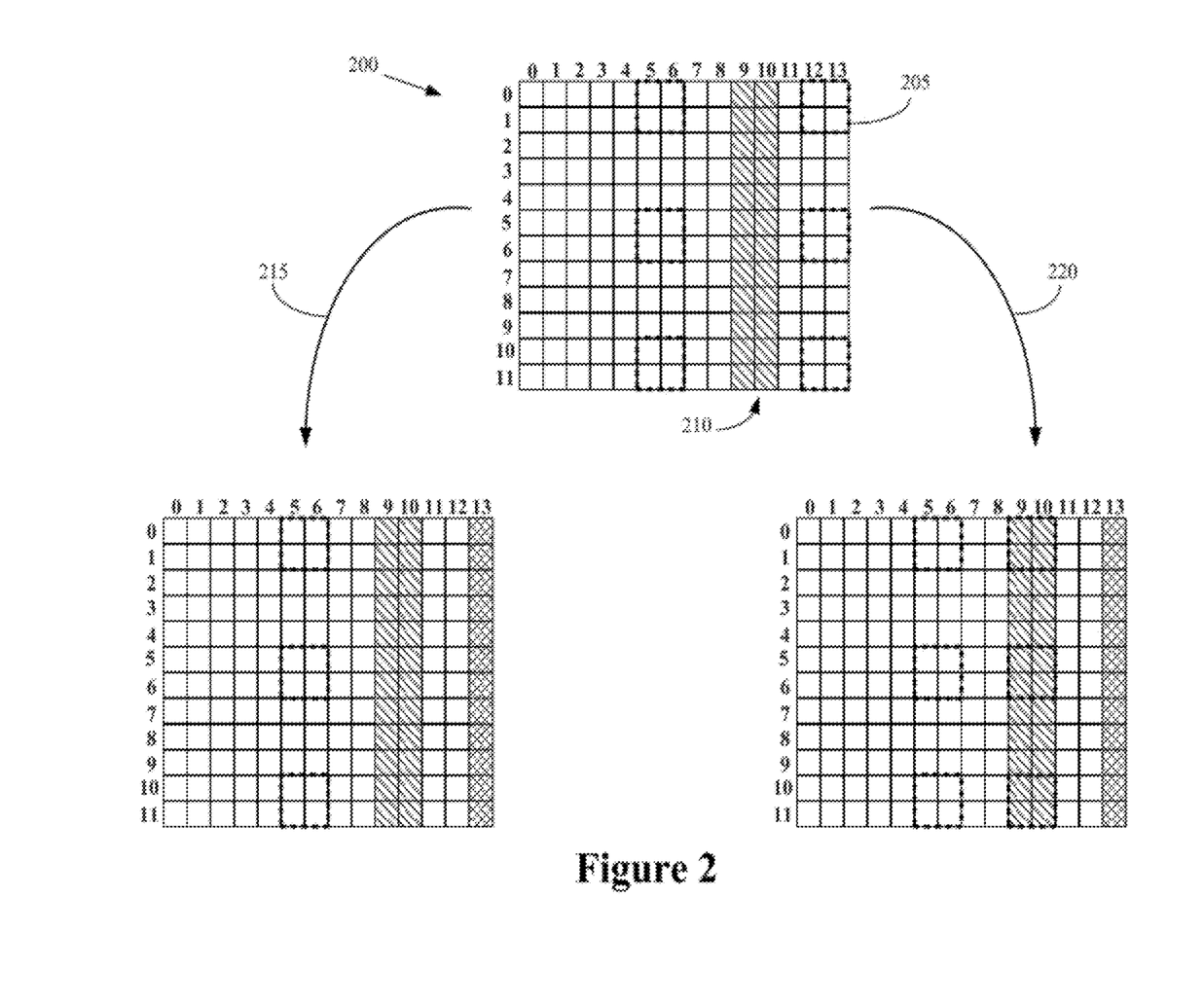
FIG. 2 conceptually illustrates embodiments of techniques for shifting and/or de-allocating resource elements to accommodate symbols that are reserved for mode switching when a relay node is present in the communication path.

FIG. 2 conceptually illustrates embodiments of techniques for shifting and/or de-allocating resource elements to accommodate symbols that are reserved for mode switching when a relay node is present in the communication path. In the illustrated embodiment, a resource block 200 includes 12 subcarriers that are numbered (0-11) along the vertical axis and 14 time intervals that are numbered (0-13) along the horizontal axis. Each small square corresponds to one resource element that can be used to transmit one symbol. The symbols may be used to transmit data, reference symbols, and the like. In the illustrated embodiment, a first type of reference symbols is allocated to the resource elements indicated by the dashed boxes 205. For example, demodulation reference symbols that are used by receivers to demodulate the signals in the resource block 200 may be allocated to the boxes 205. A second type of reference symbols may be allocated to the resource elements 210 indicated by the hatching. For example, channel state information reference symbols that are used by receivers to estimate the state of channels of the air interface and to generate feedback to the transmitter may be allocated to the resource elements 210.

When a relay node is present in the communication path, the last symbol (13) is reserved for mode switching at the relay node and therefore no symbols are transmitted in the last symbol (13). In one embodiment, indicated by the arrow 215, nodes along the communication path may modify the pattern of resource elements allocated to the first type of reference symbols by removing the resource elements that overlap with the last symbol (13). However, this decreases the symbol energy by half, which may significantly reduce the ability of receivers to demodulate symbols when the first type of reference symbols are demodulation symbols. Alternatively, as indicated by the arrow 220, the portion of the resource element pattern that overlaps with the last symbol (13) can be shifted, e.g., to symbols (9-10). However, shifting the first type of reference symbols into the resource elements used by the second type of reference symbols may lead to collisions that may make it difficult or impossible to demodulate and/or decode the two types of reference symbols that overlap in these resource elements, particularly if the different types of reference symbols are allocated different antenna ports for transmission over the air interface.

Figure 3:
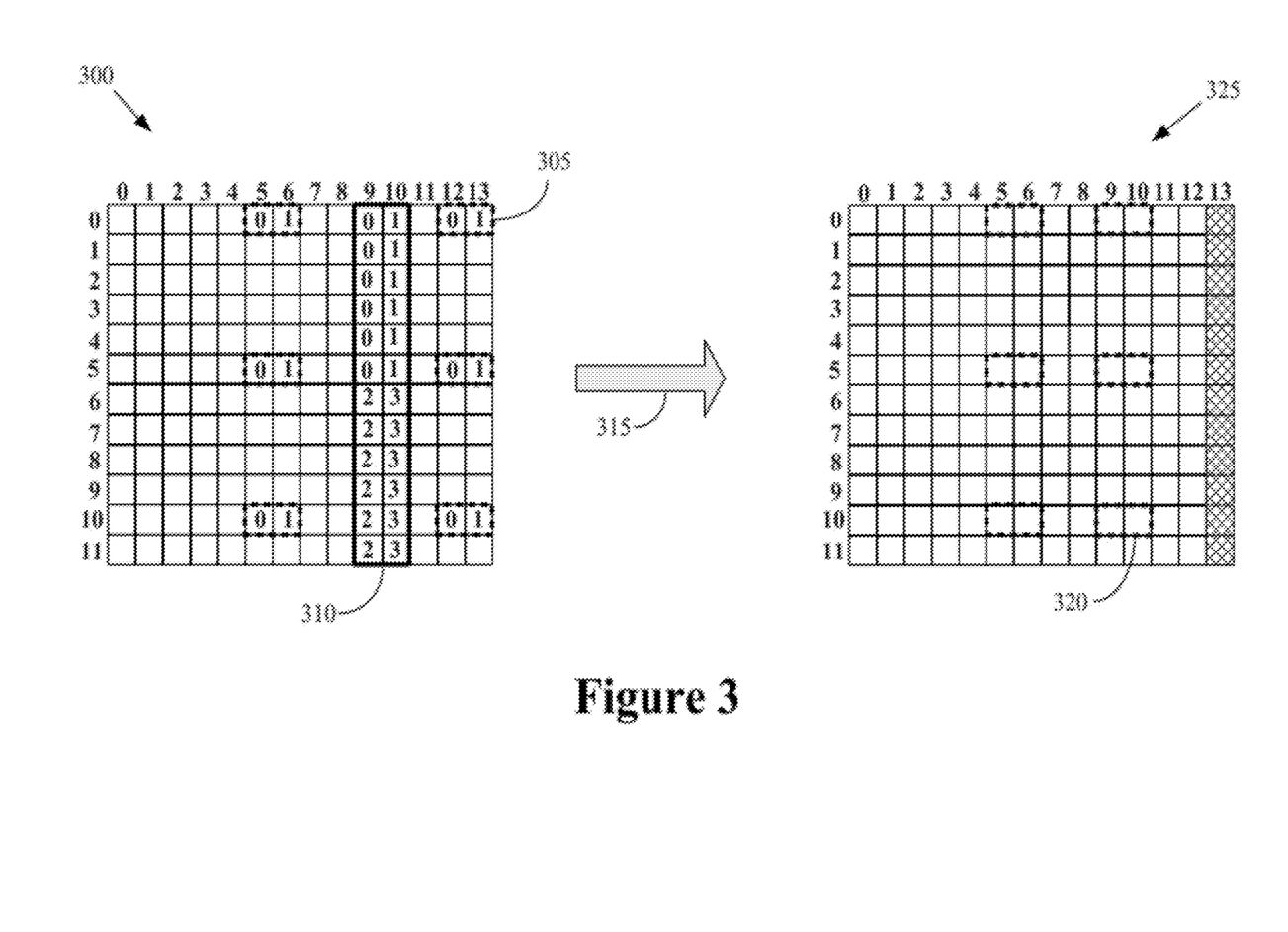
FIG. 3 conceptually illustrates a first exemplary embodiment of a method of modifying a pattern of resource elements allocated to a first type of reference symbols.

FIG. 3 conceptually illustrates a first exemplary embodiment of a method of modifying a pattern of resource elements allocated to a first type of reference symbols. In the illustrated embodiment, a resource block 300 includes 12 subcarriers that are numbered (0-11) along the vertical axis and 14 time intervals that are numbered (0-13) along the horizontal axis. Each small square corresponds to one resource element that can be used to transmit one symbol and individual resource elements can be indicated using the convention (subcarrier number, time interval number). A first type of reference symbol is allocated to the pattern of resource elements indicated by the dashed boxes 305. A second type of reference symbols is allocated to the resource elements indicated by the boldfaced box 310. The antenna ports allocated to each resource element for transmission of the corresponding reference symbol are indicated by the number in the resource element box. In the illustrated embodiment, resource elements for the first type of reference symbol are allocated two antenna ports (0, 1) and resource elements for the second type of reference symbol are allocated four antenna ports (0-3). For example, the first type of symbol can be transmitted using antenna ports 0, 1 for the resource elements (0, 5) and (0, 6), respectively.

The resource element patterns 305, 310 may be used for communication over air interfaces as long as no relay nodes are present in the communication path between the base station and user equipment. However, if one or more relay nodes are present in the communication path, communication nodes in the communication path may use modified resource element patterns to accommodate symbols that are reserved for mode switching at the relay node. In the illustrated embodiment, the last symbol (13) is reserved for mode switching when a relay node is present in the communication path. In the illustrated embodiment, the pattern 305 is modified (as indicated by the arrow 315) by shifting the resource elements for the first type of reference symbol from symbols 12-13 to a modified resource element pattern 320 that includes symbols 9-10, as shown in the modified resource block 325. In the interest of clarity, the boldfaced box indicating the resource elements allocated to the second type of reference symbols is not shown in the resource block 325. However, these resource elements remain allocated to the second type of reference symbols in the illustrated embodiment. The second type of symbol may therefore be transmitted in these symbols using the antenna ports indicated in resource block 300 regardless of whether the first type of symbols are transmitted in any of the resource blocks corresponding to symbols 9-10.

Performing the shift of the resource element pattern 305 causes the resource elements allocated to the first type of reference symbol to collide with the second type of reference symbols that have already been allocated symbols 9-10. In some embodiments, the different types of reference symbols may be encoded with different coding sequences, such as different Walsh codes, and so it may be theoretically possible to transmit them in the same reference elements. However, the complexities of decoding different sequences transmitted from different antenna ports over different air interface channels may make it difficult or impossible to accurately estimate the transfer function and demodulate/decode the different reference symbols in practice.

Figure 4:
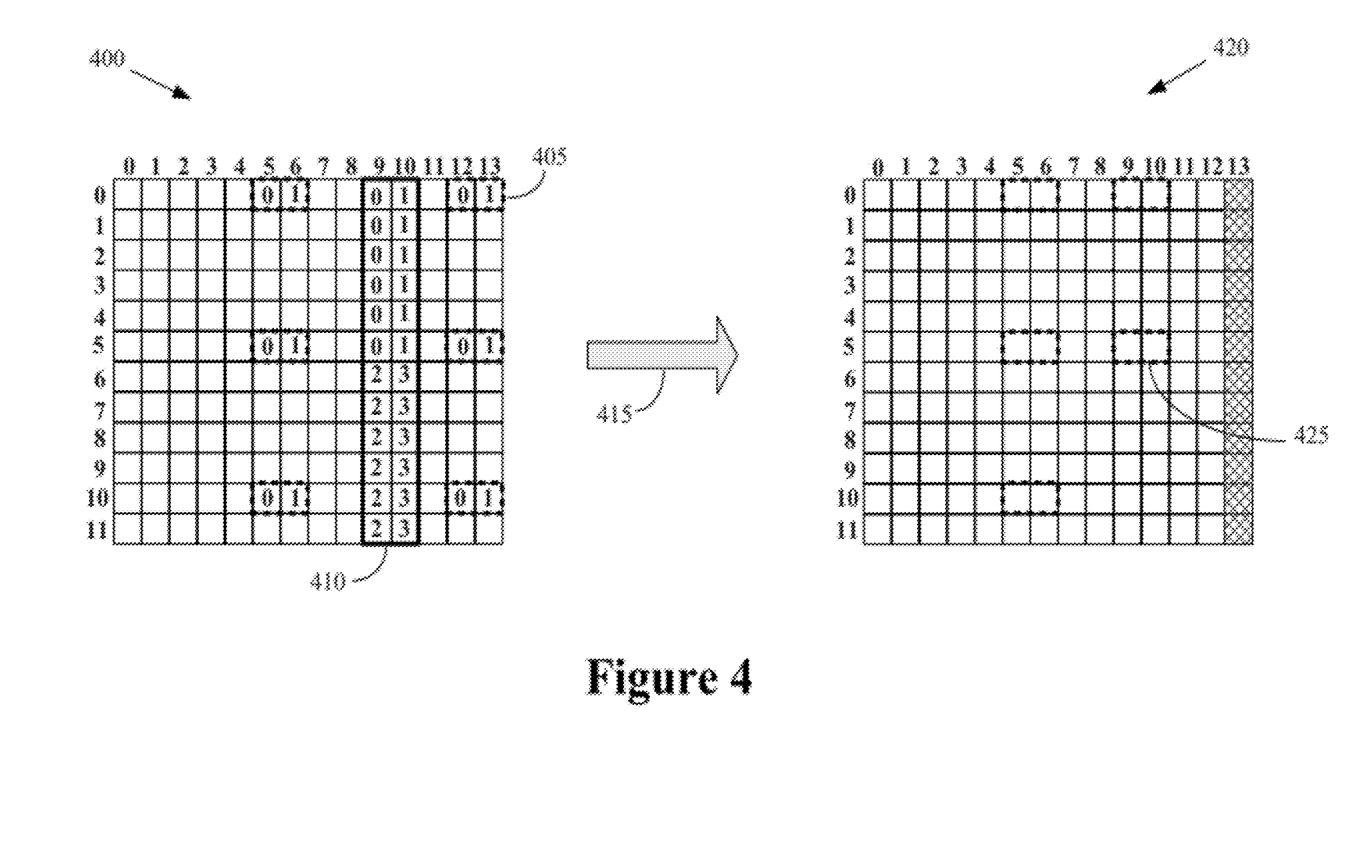
FIG. 4 conceptually illustrates a second exemplary embodiment of a method of modifying a pattern of resource elements allocated to a first type of reference symbols.

FIG. 4 conceptually illustrates a second exemplary embodiment of a method of modifying a pattern of resource elements allocated to a first type of reference symbols. In the illustrated embodiment, a resource block 400 includes 12 subcarriers and 14 time intervals that define resource elements that can be used to transmit one symbol, as discussed herein. First and second reference symbols can be allocated corresponding patterns 405, 410 of resource elements when no relay nodes are present in the communication path. The antenna ports allocated to each resource element for transmission of the corresponding reference symbol are indicated by the number in the resource element box. In the illustrated embodiment, the resource elements for the first type of reference symbols are allocated two antenna ports (0, 1) and the resource elements for the second type of reference symbols are allocated four antenna ports (0-3).

When a relay node is present in the communication path, the resource element pattern 405 used by the first type of reference symbols may be modified (as indicated by the arrow 415) to accommodate a finite mode switching time, as shown in the resource block 420. In the illustrated embodiment, the modified resource element pattern 425 includes resource elements that are selected based upon the antenna ports that are used to transmit the first and second type of reference symbols. Nodes in the communication path can compare the antenna ports used to transmit different types of reference symbols in overlapping resource elements. The different reference symbols may be allocated to the overlapping resource elements when the same antenna port is allocated for transmission of the different reference symbols. For example, when the resource elements (0, 12), (0, 13) in the pattern 405 are shifted to the resource elements (0, 9), (0, 10) in the pattern 425, a comparison of the antenna ports allocated to these resource elements indicates that the first and second type of reference symbols are transmitted over antenna port 0 in resource element (0, 9) and antenna port 1 in resource element (0, 10). The reference symbols share the same air interface channels so the transfer function can be estimated and the symbols can be demodulated/decoded by the receiver in a straightforward manner when they are transmitted concurrently using different coding sequences.

In the illustrated embodiment, after a shift, the first type of reference symbol would be transmitted over antenna port 0 in resource element (10, 9) and antenna port 1 in resource element (10, 10). The second type of reference symbol is transmitted over antenna port 2 in resource element (10, 9) and antenna port 3 in resource element (10, 10). A comparison of the antenna ports reveals that the first and second types of reference symbols would be allocated different antenna ports in these overlapping resource elements. The reference symbols therefore would not share the same air interface channels and would have different transfer functions. Consequently, the reference symbols would be very difficult or impossible to demodulate/decode when they are transmitted concurrently even though they may be encoded using different coding sequences. In the illustrated embodiment, the pattern 425 may therefore be modified by dropping or de-allocating the resource elements (10, 9) and (10, 10). In the interest of clarity, the boldfaced box 410 is not depicted in the resource block 420 but the symbols 9, 10 remain allocated to the second type of reference symbol. Thus, although the first type of reference symbol is bypassed for transmission in the resource elements (10, 9) and (10, 10), the second type of reference symbol may still be transmitted in these resource elements.

Figure 5:
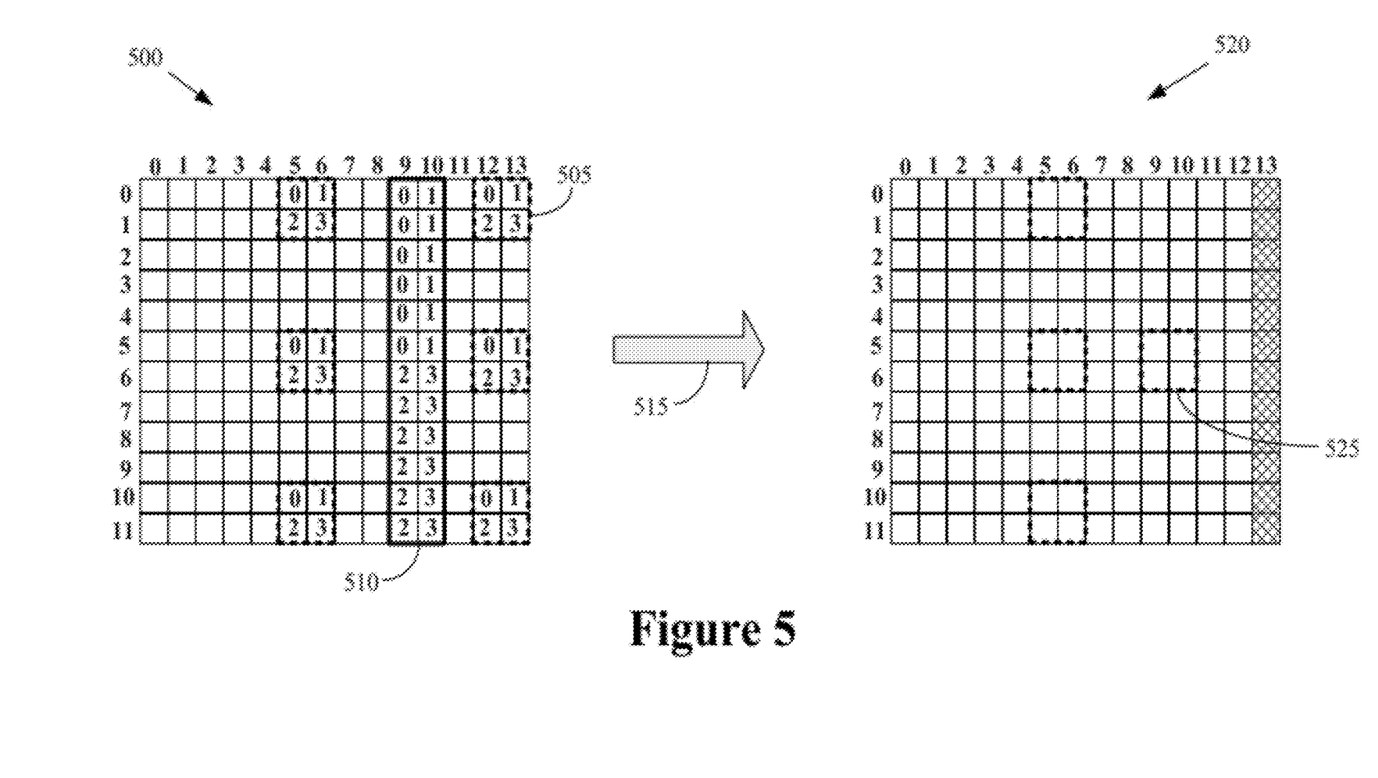
FIG. 5 conceptually illustrates a third exemplary embodiment of a method of modifying a pattern of resource elements allocated to a first type of reference symbols.

FIG. 5 conceptually illustrates a third exemplary embodiment of a method of modifying a pattern of resource elements allocated to a first type of reference symbols. In the illustrated embodiment, a resource block 500 includes 12 subcarriers and 14 time intervals that define resource elements that can be used to transmit one symbol, as discussed herein. First and second reference symbols can be allocated corresponding patterns 505, 510 of resource elements when no relay nodes are present in the communication path. The antenna ports allocated to each resource element for transmission of the corresponding reference symbol are indicated by the number in the resource element box. In the illustrated embodiment, resource elements for the first type of reference symbols are allocated four antenna ports (0-3) and the resource elements for the second type of reference symbols are allocated four antenna ports (0-3).

When a relay node is present in the communication path, the resource element pattern 505 used by the first type of reference symbols may be modified (as indicated by the arrow 515) to accommodate a finite mode switching time, as shown in the resource block 520. In the illustrated embodiment, the modified resource element pattern 525 includes resource elements that are selected based upon the antenna ports that are used to transmit the first and second type of reference symbols. Nodes in the communication path can compare the antenna ports used to transmit different types of reference symbols in overlapping resource elements. The different reference symbols may be allocated to the overlapping resource elements when the same antenna ports are allocated for transmission of the different reference symbols. For example, when the resource elements (5, 12), (5, 13), (6, 12), (6, 13) in the pattern 505 are shifted to the resource elements (5, 9), (5, 10), (6, 9), (6, 10) in the pattern 525, a comparison of the antenna ports allocated to these resource elements indicates that the first and second type of reference symbols are transmitted over antenna port 0 in resource element (5, 9), antenna port 1 in resource element (5, 10), antenna port 2 in resource element (6, 9), and antenna port 3 in resource element (6, 10). The reference symbols therefore share the same antenna ports and air interface channels and can be demodulated and/or decoded by the receiver in a straightforward manner when they are transmitted concurrently using different coding sequences.

In the illustrated embodiment, after a shift, the first type of reference symbol would be transmitted over antenna port 0 in resource element (0, 9), antenna port 1 in resource element (0, 10), antenna port 2 in resource element (1, 9), and antenna port 3 in resource element (1, 10). The second type of reference symbol is transmitted over antenna port 0 in resource element (0, 9), antenna port 1 in resource element (0, 10), antenna port 0 in resource element (1, 9), and antenna port 1 in resource element (1, 10). A comparison of the antenna ports therefore reveals that the first and second types of reference symbols would be allocated different antenna ports in the overlapping resource elements. The reference symbols therefore would not share the same air interface channels and would be very difficult or impossible to decode when they are transmitted concurrently even though they may be encoded using different coding sequences. In the illustrated embodiment, the pattern 525 may therefore be modified by dropping or de-allocating the resource elements (0, 9), (0, 10), (1, 9), and (1, 10). In the interest of clarity, the boldfaced box 510 is not depicted in the resource block 520 but the symbols 9, 10 remain allocated to the second type of reference symbol.

Thus, although the first type of reference symbol is bypassed for transmission in the resource elements (0, 9), (0, 10), (1, 9), and (1, 10), the second type of reference symbol is still transmitted in these resource elements.

Figure 6:
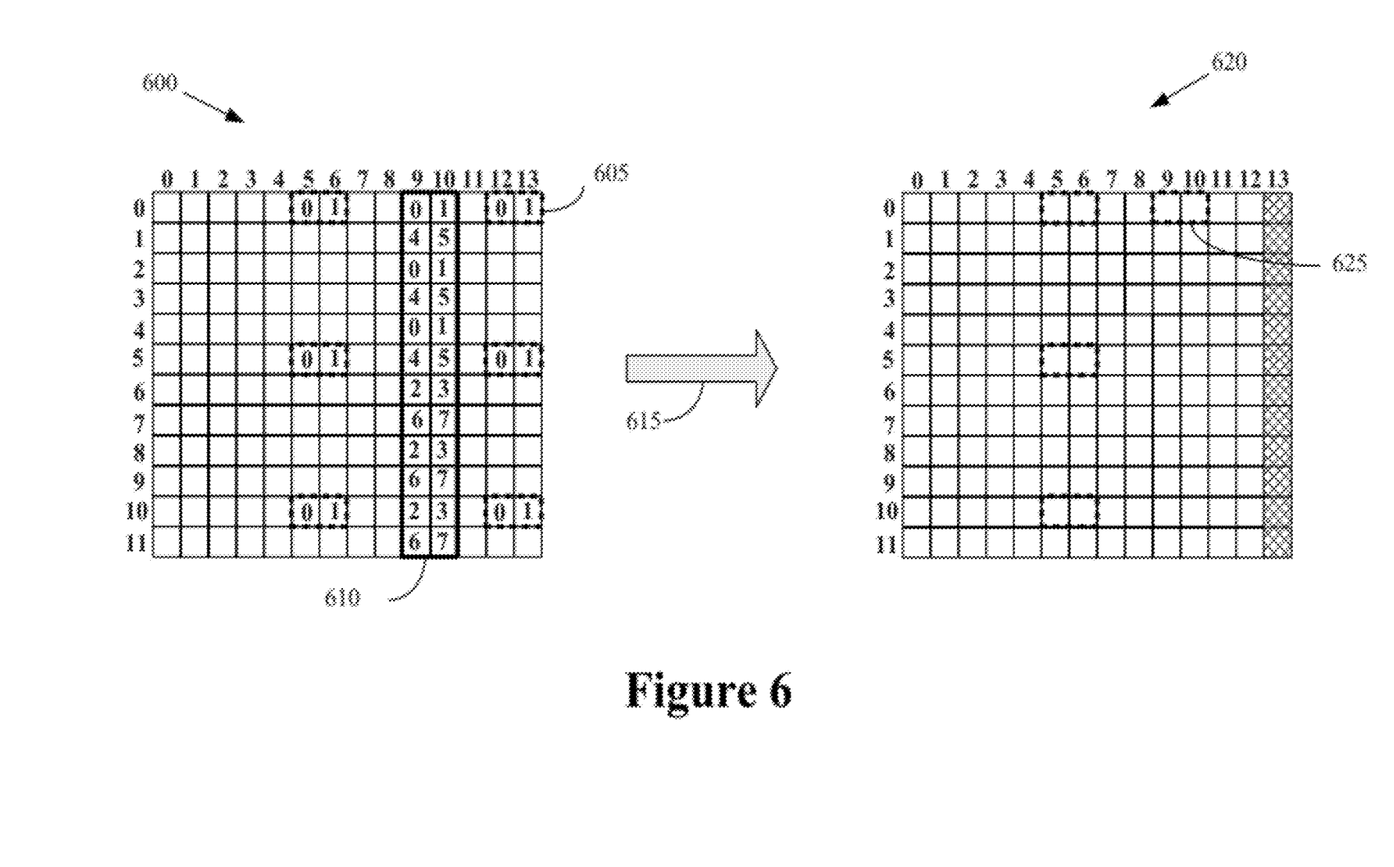
FIG. 6 conceptually illustrates a fourth exemplary embodiment of a method of modifying a pattern of resource elements allocated to a first type of reference symbols.

FIG. 6 conceptually illustrates a fourth exemplary embodiment of a method of modifying a pattern of resource elements allocated to a first type of reference symbols. In the illustrated embodiment, a resource block 600 includes 12 subcarriers and 14 time intervals that define resource elements that can be used to transmit symbols, as discussed herein. First and second types of reference symbols can be allocated corresponding patterns 605, 610 of resource elements when no relay nodes are present in the communication path. The antenna ports allocated to each resource element for transmission of the corresponding reference symbol are indicated by the number in the resource element box. In the illustrated embodiment, the resource elements for the first type of reference symbols are allocated two antenna ports (0, 1) and the resource elements for the second type of reference symbols are allocated eight antenna ports (0-7).

When a relay node is present in the communication path, the resource element pattern 605 used by the first type of reference symbols may be modified (as indicated by the arrow 615) to accommodate a finite mode switching time, as shown in the resource block 620. In the illustrated embodiment, the modified resource element pattern 625 includes resource elements that are selected based upon the antenna ports that are used to transmit the first and second type of reference symbols. Nodes in the communication path can compare the antenna ports used to transmit different types of reference symbols in overlapping resource elements. The different reference symbols may be allocated to the overlapping resource elements when the same antenna port is allocated for transmission of the different reference symbols. For example, when the resource elements (0, 12), (0, 13) in the pattern 605 are shifted to the resource elements (0, 9), (0, 10) in the pattern 625, a comparison of the antenna ports allocated to these resource elements indicates that the first and second type of reference symbols are transmitted over antenna port 0 in resource element (0, 9) and antenna port 1 in resource element (0, 10). The reference symbols therefore share the same air interface channels and can be decoded by the receiver in a straightforward manner when they are transmitted concurrently using different coding sequences.

In the illustrated embodiment, after a shift, the first type of reference symbol would be transmitted over antenna port 0 in resource elements (5, 9), (10, 9) and antenna port 1 in resource elements (5, 10), (10, 10). The second type of reference symbol is transmitted over antenna port 4 in resource element (5, 9), antenna port 5 in resource element (5, 10), antenna port 2 in resource element (10, 9), and antenna port 3 in resource element (10, 10). A comparison of the antenna ports therefore reveals that the first and second types of reference symbols would be allocated different antenna ports in the overlapping resource elements (5, 9), (5, 10), (10, 9), (10, 10). The reference symbols therefore would not share the same air interface channels and would be very difficult or impossible to decode when they are transmitted concurrently even though they may be encoded using different coding sequences. In the illustrated embodiment, the pattern 625 may therefore be modified by dropping or de-allocating the resource elements (5, 9), (5, 10), (10, 9), (10, 10). In the interest of clarity, the boldfaced box 610 is not depicted in the resource block 620 but the symbols 9, 10 remain allocated to the second type of reference symbol. Thus, although the first type of reference symbol is bypassed for transmission in the resource elements (5, 9), (5, 10), (10, 9), (10, 10), the second type of reference symbol is still transmitted in these resource elements.

Embodiments of the techniques described herein may allow multiple stages of reduction of the number of resource elements in the first reference symbol pattern. The degree of reduction may depend on how many resource elements may be removed in order for the remaining resource elements to match a second reference symbol pattern and pattern of antenna ports. Selectively removing resource elements from the set that is allocated to a particular type of reference symbol may increase the total reference symbol energy available relative to embodiments that simply remove reference elements that conflict with symbols reserved for mode switching. Furthermore, selectively removing resource elements may prevent collisions between different types of reference symbols. These collisions may make it difficult or impossible to receive either type of reference symbol in reference elements that are experiencing a collision and so selectively removing the resource elements when the reference symbols do not share an antenna port may improve the overall performance of the system.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   identifying, at a base station, at least one overlapping resource element in a resource block by comparing a first pattern of resource elements associated with first reference symbols to a second pattern of resource elements associated with second reference symbols;
   transmitting, from the base station, the first reference symbols and the second reference symbols in said at least one overlapping resource element when first and second antenna ports allocated for transmission of the first reference symbols and the second reference symbols in said at least one overlapping resource element are the same; and
   removing at least one overlapping resource element from the first pattern of resource elements when the first and second antenna ports are different.

2. The method of claim 1, wherein identifying said at least one overlapping resource element comprises identifying at least one overlapping time interval and subcarrier in a resource block comprising a plurality of subcarriers and a plurality of symbols.

3. The method of claim 1, wherein identifying said at least one overlapping resource element comprises comparing the first pattern of resource elements associated with demodulation reference symbols to the second pattern of resource elements associated with channel state information reference symbols.

4. The method of claim 1, comprising determining that a relay node is present in a communication path between the base station and at least one user equipment and shifting a portion of the first pattern of resource elements out of a symbol reserved for mode switching at the relay node.

5. The method of claim 4, wherein identifying said at least one overlapping resource element comprises comparing the shifted portion of the first pattern to the second pattern.

6. The method of claim 1, wherein identifying said at least one overlapping resource element comprises comparing a first predetermined allocation of resource elements and antenna ports represented by the first pattern to a second predetermined allocation of resource elements and antenna ports represented by the second pattern.

7. The method of claim 1, wherein transmitting the first reference symbols and the second reference symbols in said at least one overlapping resource element comprises encoding the first reference symbols and the second reference symbols using first and second code sequences.

8. A base station comprising:
   a computing device to:
      identify at least one overlapping resource element in a resource block by comparing a first pattern of resource elements associated with first reference symbols to a second pattern of resource elements associated with second reference symbols;
      transmit the first reference symbols and the second reference symbols in said at least one overlapping resource element when first and second antenna ports allocated for transmission of the first reference symbols and the second reference symbols in said at least one overlapping resource element are the same; and remove at least one overlapping resource element from the first pattern of resource elements when the first and second antenna ports are different.

9. The base station of claim 8, wherein the computing device is to identify at least one overlapping time interval and subcarrier in a resource block comprising a plurality of subcarriers and a plurality of symbols.

10. The base station of claim 8, wherein the computing device is to identify said at least one overlapping resource element by comparing the first pattern of resource elements associated with demodulation reference symbols to the second pattern of resource elements associated with channel state information reference symbols.

11. The base station of claim 8, wherein the computing device is to determine that a relay node is present in a communication path between the base station and at least one user equipment and wherein the base station is configured to shift a portion of the first pattern of resource elements out of a symbol reserved for mode switching at the relay node.

12. The base station of claim 11, wherein the computing device is to identify said at least one overlapping resource element by comparing the shifted portion of the first pattern to the second pattern.

13. The base station of claim 8, wherein the computing device is to identify said at least one overlapping resource elements by comparing a first predetermined allocation of resource elements and antenna ports represented by the first pattern to a second predetermined allocation of resource elements and antenna ports represented by the second pattern.

14. The base station of claim 8, wherein the computing device is to encode the first reference symbols and the second reference symbols using first and second code sequences.

15. A method, comprising:
identifying, at a relay node, at least one overlapping resource element in a resource block by comparing a first pattern of resource elements associated with first reference symbols to a second pattern of resource elements associated with second reference symbols; and
receiving, at the relay node, the first reference symbols and the second reference symbols in said at least one overlapping resource element when first and second antenna ports allocated for transmission of the first reference symbols and the second reference symbols in said at least one overlapping resource element are the same
wherein at least one overlapping resource element is removed from the first pattern of resource elements when the first and second antenna ports are different.

16. The method of claim 15, wherein identifying said at least one overlapping resource element comprises identifying at least one overlapping time interval and subcarrier in a resource block comprising a plurality of subcarriers and a plurality of symbols.

17. The method of claim 15, wherein identifying said at least one overlapping resource element comprises comparing the first pattern of resource elements associated with demodulation reference symbols to the second pattern of resource elements associated with channel state information reference symbols.

18. The method of claim 15, comprising determining that a portion of the first pattern of resource elements are to be shifted out of a symbol reserved for mode switching at the relay node, and wherein identifying said at least one overlapping resource element comprises comparing the shifted portion of the first pattern to the second pattern.

19. The method of claim 15, wherein identifying said at least one overlapping resource element comprises comparing a first predetermined allocation of resource elements and antenna ports represented by the first pattern to a second predetermined allocation of resource elements and antenna ports represented by the second pattern.

20. The method of claim 15, comprising demodulating at least one signal received at the relay node using at least one of the first reference symbol or the second reference symbol.

21. The method of claim 15, comprising relaying at least one signal received at the relay node in response to receiving at least one resource block comprising at least one of the first reference symbol or the second reference symbol.

22. A relay node comprising:
a computing device to:
identify at least one overlapping resource element in a resource block by comparing a first pattern of resource elements associated with first reference symbols to a second pattern of resource elements associated with second reference symbols; and
receive the first reference symbols and the second reference symbols in said at least one overlapping resource element when first and second antenna ports allocated for transmission of the first reference symbols and the second reference symbols in said at least one overlapping resource element are the same,
wherein at least one overlapping resource element is removed from the first pattern of resource elements when the first and second antenna ports are different.

23. The relay node of claim 22, wherein the computing device is to identify at least one overlapping symbol and subcarrier in a resource block comprising a plurality of subcarriers and a plurality of symbols.

24. The relay node of claim 22, wherein the computing device is to identify said at least one overlapping resource element by comparing the first pattern of resource elements associated with demodulation reference symbols to the second pattern of resource elements associated with channel state information reference symbols.

25. The relay node of claim 22, wherein the computing device is to determine that a portion of the first pattern of resource elements are to be shifted out of a symbol reserved for mode switching at the relay node, and wherein the relay node is configured to identify said at least one overlapping resource element by comparing the shifted portion of the first pattern to the second pattern.

26. The relay node of claim 22, wherein the computing device is to identify said at least one overlapping resource element by comparing a first predetermined allocation of resource elements and antenna ports represented by the first pattern to a second predetermined allocation of resource elements and antenna ports represented by the second pattern.

27. The relay node of claim 22, wherein the computing device is to demodulate at least one signal received at the relay node using at least one of the first reference symbol or the second reference symbol.

28. The relay node of claim 22, wherein the computing device is to relay at least one signal received at the relay node in response to receiving at least one resource block comprising at least one of the first reference symbol or the second reference symbol.

29. A method, comprising:
identifying, at user equipment, at least one overlapping resource element in a resource block by comparing a first pattern of resource elements associated with first reference symbols to a second pattern of resource elements associated with second reference symbols;
receiving, at said user equipment, the first reference symbols and the second reference symbols in said at least one overlapping resource element when first and second antenna ports allocated for transmission of the first reference symbols and the second reference symbols in said at least one overlapping resource element are the same; and removing at least one overlapping resource element from the first pattern of resource elements when the first and second antenna ports are different.

30. The method of claim 29, wherein identifying said at least one overlapping resource element comprises identifying at least one overlapping symbol and subcarrier in a resource block comprising a plurality of subcarriers and a plurality of symbols.

31. The method of claim 30, wherein identifying said at least one overlapping resource element comprises comparing the first pattern of resource elements associated with demodulation reference symbols to the second pattern of resource elements associated with channel state information reference symbols.

32. The method of claim 30, comprising determining that a portion of the first pattern of resource elements are to be shifted out of a symbol reserved for mode switching at a relay node, and wherein identifying said at least one overlapping resource element comprises comparing the shifted portion of the first pattern to the second pattern.

33. The method of claim 30, wherein identifying said at least one overlapping resource element comprises comparing a first predetermined allocation of resource elements and antenna ports represented by the first pattern to a second predetermined allocation of resource elements and antenna ports represented by the second pattern.

34. The method of claim 30, comprising demodulating at least one signal using at least one of the first reference symbols or the second reference symbols and decoding said at least one demodulated signal.

35. The method of claim 30, comprising determining channel state information using at least one of the first reference symbols or the second reference symbols and providing feedback indicative of the determined channel state information.

36. User equipment comprising:
a computing device to:
identify at least one overlapping resource element in a resource block by comparing a first pattern of resource elements associated with first reference symbols to a second pattern of resource elements associated with second reference symbols; and
receive the first reference symbols and the second reference symbols in said at least one overlapping resource element when first and second antenna ports allocated for transmission of the first reference symbols and the second reference symbols in said at least one overlapping resource element are the same,
wherein at least one overlapping resource element is removed from the first pattern of resource elements when the first and second antenna ports are different.

37. The user equipment of claim 36, wherein the computing device is to identify at least one overlapping symbol and subcarrier in a resource block comprising a plurality of subcarriers and a plurality of symbols.

38. The user equipment of claim 36, wherein the computing device is to identify said at least one overlapping resource element by comparing the first pattern of resource elements associated with demodulation reference symbols to the second pattern of resource elements associated with channel state information reference symbols.

39. The user equipment of claim 36, wherein the computing device is to determine that a portion of the first pattern of resource elements are to be shifted out of a symbol reserved for mode switching at a relay node, and wherein said user equipment is configured to identify said at least one overlapping resource element by comparing the shifted portion of the first pattern to the second pattern.

40. The user equipment of claim 36, wherein the computing device is to identify said at least one overlapping resource elements by comparing a first predetermined allocation of resource elements and antenna ports represented by the first pattern to a second predetermined allocation of resource elements and antenna ports represented by the second pattern.

41. The user equipment of claim 36, wherein the computing device is to demodulate at least one signal using at least one of the first reference symbols or the second reference symbols and wherein said user equipment is configured to decode said at least one demodulated signal.

42. The user equipment of claim 36, wherein the computing device is to determine channel state information using at least one of the first reference symbols or the second reference symbols and wherein said user equipment is configured to provide feedback indicative of the determined channel state information.

43. A method comprising:
modifying a first pattern of resource elements allocated to first reference symbols, wherein modifying the first pattern comprises removing overlapping resource elements from the first pattern when the overlapping resource elements are allocated to second reference symbols that are to be transmitted using a different antenna port than the first reference symbols.

44. An apparatus comprising:
a computing device to modify a first pattern of resource elements allocated to first reference symbols, wherein modifying the first pattern comprises removing overlapping resource elements from the first pattern when the overlapping resource elements are allocated to second reference symbols that are to be transmitted using a different antenna port than the first reference symbols.

45. The apparatus of claim 44, wherein the apparatus comprises at least one of a base station, a relay node, or user equipment.

* * * * *